(12) United States Patent
Dahlfeld

(10) Patent No.: US 7,729,448 B2
(45) Date of Patent: Jun. 1, 2010

(54) FRONTEND MODULE HAVING TWO INPUTS FOR THE RECEPTION OF TRANSMITTED SIGNALS

(75) Inventor: Klaus Dahlfeld, Hebertshausen (DE)

(73) Assignee: Infineon Technologies AG, Munich (DE)

( * ) Notice: Subject to any disclaimer, the term of this patent is extended or adjusted under 35 U.S.C. 154(b) by 680 days.

(21) Appl. No.: 11/726,398

(22) Filed: Mar. 21, 2007

(65) Prior Publication Data

US 2007/0286306 A1 Dec. 13, 2007

(30) Foreign Application Priority Data

Apr. 12, 2006 (DE) .................... 10 2006 017 307

(51) Int. Cl.
*H04L 27/04* (2006.01)
(52) U.S. Cl. ............ 375/299; 455/552.1; 375/347
(58) Field of Classification Search .......... 375/299, 375/347, 349

See application file for complete search history.

(56) References Cited

U.S. PATENT DOCUMENTS

| | | | |
|---|---|---|---|
| 6,292,053 | B1 | 9/2001 | Ke |
| 2001/0034217 | A1* | 10/2001 | Loke et al. ............. 455/126 |
| 2002/0019219 | A1* | 2/2002 | Doherty ............... 455/127 |
| 2005/0208900 | A1* | 9/2005 | Karacaoglu ............ 455/78 |
| 2006/0160563 | A1* | 7/2006 | Ku .................. 455/552.1 |
| 2006/0276132 | A1* | 12/2006 | Sheng-Fuh et al. ....... 455/41.2 |

FOREIGN PATENT DOCUMENTS

| | | |
|---|---|---|
| DE | 298 19 009 U1 | 1/1999 |
| DE | 10 2004 001 094 A1 | 8/2005 |
| DE | 10 2004 026 195 A1 | 12/2005 |
| EP | 1 100 147 A2 | 5/2001 |

\* cited by examiner

*Primary Examiner*—Kevin Y Kim
(74) *Attorney, Agent, or Firm*—Slater & Matsil, L.L.P.

(57) ABSTRACT

A frontend module includes a first and a second input for transmitted signals, an amplifier, a bypass line for bypassing the amplifier, an output and a switching unit. The switching unit either forms a signal path between the first input and the output, in which the amplifier or the bypass line is coupled, or forms a signal path between the second input and the output, in which the amplifier or the bypass line is coupled.

25 Claims, 2 Drawing Sheets

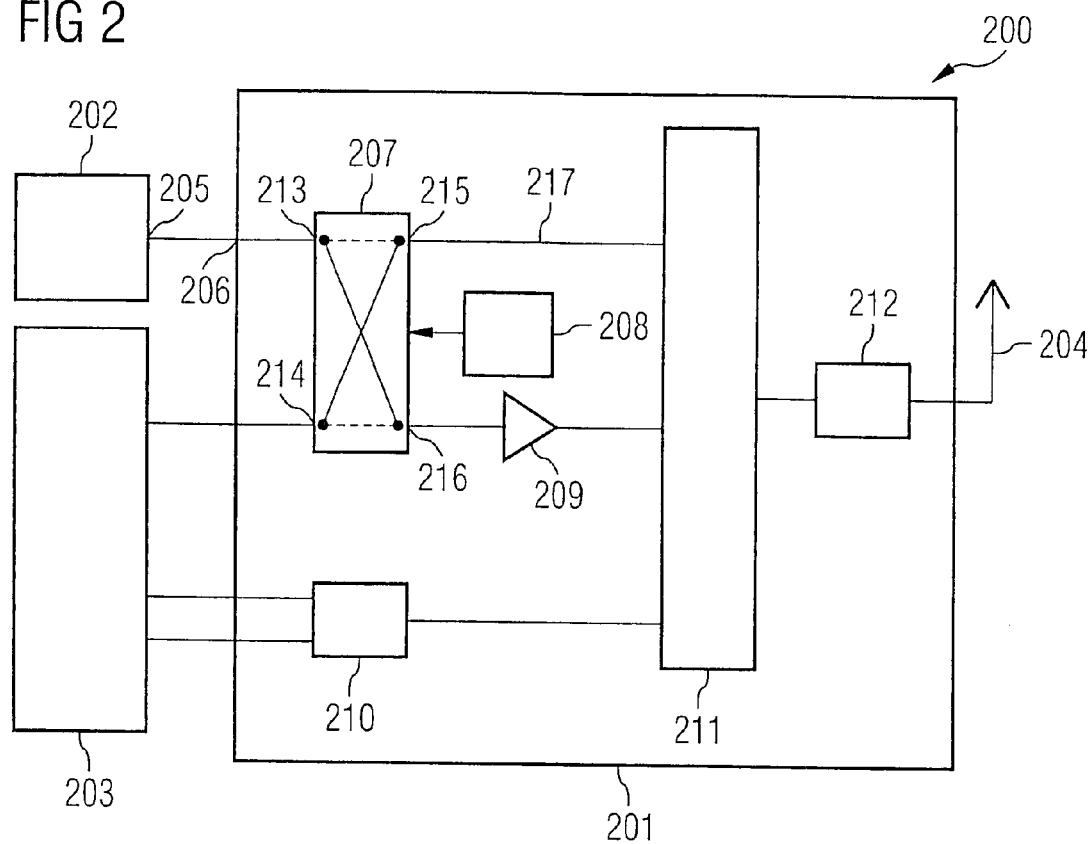
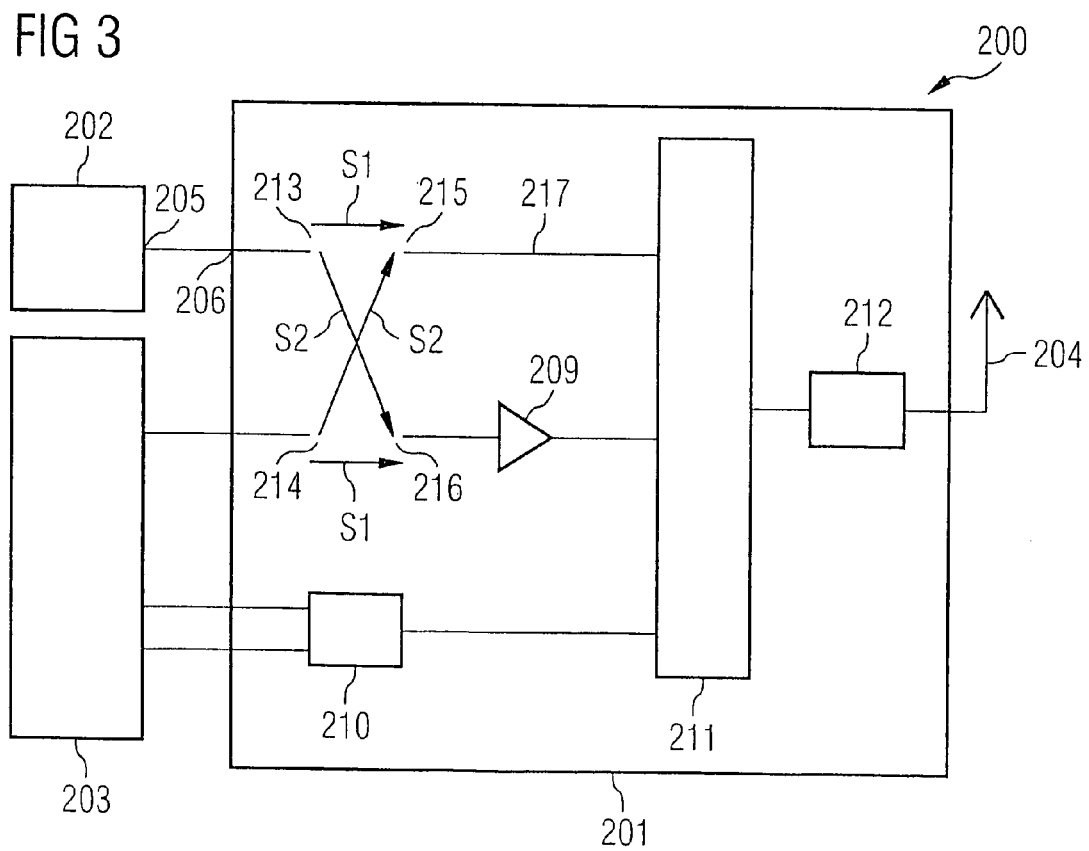

FRONTEND MODULE HAVING TWO INPUTS FOR THE RECEPTION OF TRANSMITTED SIGNALS

This application claims priority to German Patent Application 10 2006 017 307.4, which was filed Apr. 12, 2006, and is incorporated herein by reference.

TECHNICAL FIELD

The invention relates to frontend modules for wire-free communication, which have at least two inputs at which transmitted signals are received.

BACKGROUND

A frontend module is an autonomous component which, in the case of mobile radio applications, is coupled to the radio-frequency integrated circuit (IC) or circuits (ICs). In this case, the frontend module represents the linking element between the radio-frequency IC or ICs and the antenna. Both the signals received from the antenna and the signals to be transmitted via the antenna are passed via the frontend module, with the latter signals having already been mixed onto the transmission frequency in the relevant radio-frequency IC.

A frontend module generally includes a power amplifier in order to allow the transmitted signals, which have already been mixed onto the carrier frequency, to be amplified in a suitable manner. Provided that the maximum output power of the power amplifier is not required at the antenna and the radio-frequency IC that is supplying the transmitted signals is able to provide an adequate output power, the output power of the power amplifier can be reduced. A situation such as this can occur, for example, when the radio receiver is located physically close to the antenna. This situation has the disadvantage that the transmitted signals still have to pass through the power amplifier at an output power level to the antenna that corresponds to the maximum output power of the radio-frequency IC, thus the power amplifier must accordingly be activated. When the transmitted power is low, this results in increased current consumption by the frontend module and by the transmitting apparatus in which the frontend module is included.

SUMMARY OF THE INVENTION

In one aspect, embodiments of the invention provide a frontend module having reduced power consumption. In another aspect, embodiments of the invention provide a transmitting apparatus in which a frontend module is integrated.

According to one embodiment of the invention, a frontend module has a first input, a second input, an output, an amplifier stage, a bypass signal line and a switching unit. First and second transmitted signals can be received at the first and second input, respectively. The output is used to emit transmitted signals to an antenna. While transmitted signals are amplified by means of the amplifier stage in the frontend module, the transmitted signals can selectively bypass the amplifier stage, with the aid of the bypass signal line.

The switching unit is used to produce a signal path between one of the two inputs and the output of the frontend module. In a first switch position of the switching unit, a signal path is formed between the first input and the output, with the amplifier stage being coupled in the signal path. In a second switch position, a signal path is formed between the first input and the output, and comprises the bypass signal line. In a third switch position, a signal path is formed between the second input and the output, to which the amplifier stage is coupled. In a fourth switch position, a signal path is formed between the second input and the output, with the bypass signal line being coupled in the signal path.

One advantage of certain embodiments of the invention is that the amplifier stage can be used not only for amplification of the first transmitted signals but also for amplification of the second transmitted signals. Furthermore, the amplifier stage can also be bypassed if the transmitted power of the transmitted signals received by the frontend module is already sufficient for their transmission and there is no need for additional amplification by the amplifier stage. If the amplifier stage is bypassed, it is also feasible for it to be switched off, with the power consumption thus being reduced.

According to one embodiment of the invention, the switching unit comprises a first switch that, in the first switch position of the switching unit, couples the first input to the input of the amplifier stage, in the second switch position couples the first input to a first connection of the bypass signal line, in the third switch position couples the second input to the input of the amplifier stage, and in the fourth switch position couples the second input to the first connection of the bypass signal line.

By way of example, the first switch may be a DPDT switch (double-pole/double-throw). DPDT switches are also referred to in German-language specialist literature as transfer switches.

By way of example, the switching unit may also comprise a second switch that, in the first and the third switch positions of the switching unit, couples the output of the amplifier stage to the output of the frontend module, and that, in the second and the fourth switch positions, couples the second connection of the bypass signal line to the output of the frontend module.

One embodiment of the invention provides for the frontend module to receive and pass on not only transmitted signals but also received signals. In this case, the signal path through which at least a part of the received signals is passed through the frontend module comprises the bypass signal line.

According to a further embodiment of the invention, a frontend module has a first input for reception of first transmitted signals, a second input for reception of second transmitted signals, an amplifier stage for amplification of transmitted signals, a bypass signal line for bypassing the amplifier stage, an output for selective emission of the first transmitted signals or the second transmitted signals, or for selective emission of transmitted signals that are obtained from the first or the second transmitted signals, and a first switch. In one switch position, the first switch couples the first input to the input of the amplifier stage, and couples the second input to a first connection of the bypass signal line. In a further switch position, the first switch couples the first input to the first connection of the bypass signal line, and couples the second input to the amplifier stage.

One embodiment of the invention provides a second switch, which in one switch position couples the output of the amplifier stage to the output, and which in a further switch position couples the second connection of the bypass signal line to the output.

According to a further embodiment, a transmitting apparatus comprises a first apparatus for production of first transmitted signals, a second apparatus for production of second transmitted signals, and a frontend module according to one embodiment of the invention.

The first apparatus and the second apparatus may, for example, each be a radio-frequency IC.

BRIEF DESCRIPTION OF THE DRAWINGS

The invention will be explained in more detail in the following text in an exemplary manner, and with reference to the drawings, in which:

FIG. 2 shows a block diagram of a transmitting and receiving apparatus as a second exemplary embodiment of the transmitting apparatus according to the invention; and FIG. 3 shows an illustration of the signal paths in the transmitting and receiving apparatus shown in FIG. 2.

DETAILED DESCRIPTION OF ILLUSTRATIVE EMBODIMENTS

Figure 1:
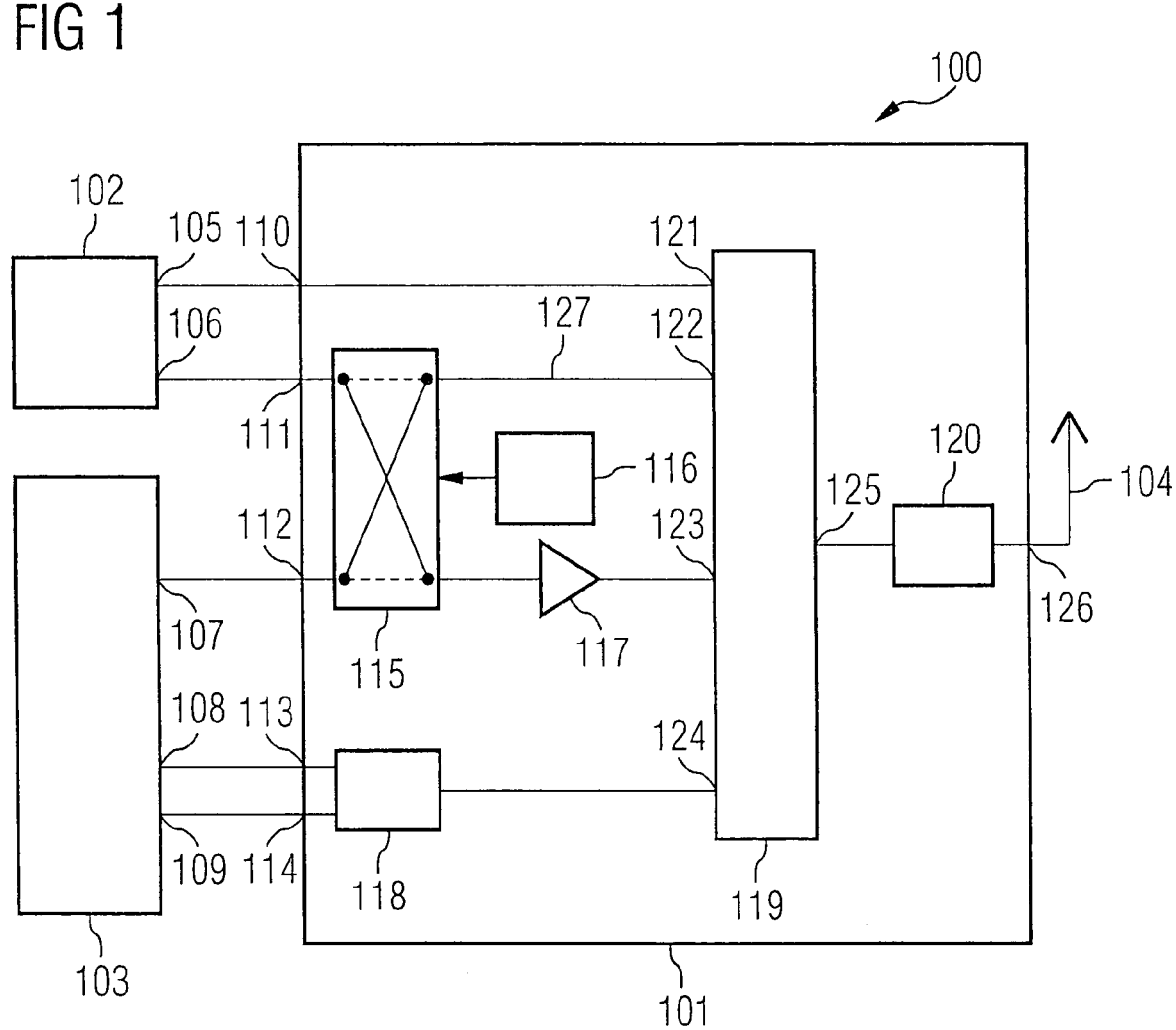
FIG. 1 shows a block diagram of a transmitting and receiving apparatus as a first exemplary embodiment of the transmitting apparatus according to the invention.

FIG. 1 illustrates a transmitting and receiving apparatus 100 with a frontend module 101. The transmitting and receiving apparatus 100 and the frontend module 101 each represent a first exemplary embodiment for the transmitting apparatus according to embodiments of the invention and the frontend module according to embodiments of the invention, respectively.

In addition to the frontend module 101, the transmitting and receiving apparatus 100 has radio-frequency integrated circuits (ICs) 102 and 103, as well as an antenna 104. Furthermore, the transmitting and receiving apparatus 100 may also have further assemblies, such as one or more baseband ICs, which are not illustrated in FIG. 1. In various embodiments, the functions of ones of the ICs can be combined into a single IC.

The radio-frequency IC 102 has an input 105 and an output 106. The radio-frequency IC 103 has an output 107 and inputs 108 and 109. The input 105 is coupled to an output 110 of the frontend module 101, and the output 106 is coupled to an input 111 of the frontend module 101. Furthermore, the output 107 and the inputs 108 and 109 are respectively coupled, as illustrated in FIG. 1, to an input 112 and to a respective output 113 and 114 of the frontend module 101.

The frontend module 101 has a DPDT (double-pole/double-throw) switch 115, a control unit 116, a power amplifier 117, a transformer 118, an SP4T (single-pole/quadruple throw) switch 119 and a bandpass filter 120. The output 110 of the frontend module 101 is coupled to a connection 121 of the SP4T switch 119. The two inputs of the DPDT switch 115 are coupled to the inputs 111 and 112. One output of the DPDT switch 115 is coupled to a connection 122 of the SP4T switch 119. The other output of the DPDT switch 115 is coupled to the input of the power amplifier 117, which is coupled on the output side to a connection 123 of the SP4T switch 119. The control unit 116 drives a control input of the DPDT switch 115. The input side of the transformer 118 is coupled to a connection 124 of the SP4T switch 119. The two outputs of the transformer 118 are coupled to the outputs 113 and 114. The bandpass filter 120 is arranged between a connection 125 of the SP4T switch 119 and a connection 126 of the frontend module 101 to which the antenna 104 is coupled.

The method of operation of the transmitting and receiving apparatus 100 will be described in the following text. In the present example, the radio-frequency IC 102 generates transmitted signals and processes received signals, which are both based on the Bluetooth® standard. The radio-frequency IC 103 generates wireless local area network (WLAN) transmitted signals, and processes WLAN received signals. In other embodiments, other transmission standards can be utilized for one or both of the signals.

During transmission, transmitted signals that have already been mixed onto the transmitted frequency are generated by the radio-frequency IC 102 or 103 and are passed at the respective output 106 or 107 to the frontend module 101. The transmitted signals that the frontend module 101 receives at the input 111 or 112 can be passed to the antenna 104 on two different paths. When the DPDT switch 115 is in a first switch position, the transmitted signals are supplied to the power amplifier 117, and then passed through the SP4T switch 119 and the bandpass filter 120 before being passed to the antenna 104. When the DPDT switch 115 is in a second switch position, the transmitted signals bypass the power amplifier 117, and are fed via a bypass signal line 127 to the connection 122 of the SP4T switch 119. The transmitted signals are passed from the SP4T switch 119 via the bandpass filter 120 to the antenna 104.

An advantage of the embodiment described above is that the transmitted signals do not necessarily have to pass through the power amplifier 117. If, for example, the transmitted signals produced by the radio-frequency IC 102 or 103 are already at an adequate transmission power level, then there is no longer any need for the transmitted signals to be amplified any further by the power amplifier 117. In this case, the present embodiment makes it possible to bypass the power amplifier 117. Since the power amplifier 117 is not required in this situation, it can be switched off, thus reducing the overall current drawn by the transmitting and receiving apparatus 100.

During reception, received signals are received at the antenna 104 and are passed via the bandpass filter 120 and the SP4T switch 119 to the radio-frequency IC 102 or 103. If the received signals are based on the Bluetooth standard, the received signals are transferred via the output 110 of the frontend module 101 to the radio-frequency IC 102. If these are WLAN received signals, the received signals are supplied to the transformer 118 (balun; balanced-unbalanced), which transforms the received signals into differential signals, and passes them via the differential outputs 113 and 114 to the radio-frequency IC 103. The power amplifier 117 can be switched off during reception.

The SP4T switch 119 will be coupled according to the selected path. The SP4T switch 119 couples the connection 125 to one of the connections 121, 122, 123 or 124, depending on the switch position. In order to select the switch position, the SP4T switch 119 has a control input, which is not illustrated in FIG. 1. A control unit drives the SP4T switch 119 via this control input. The control unit may, for example, be arranged on one of the radio-frequency ICs 102 and 103, or on a baseband IC. The control unit that drives the SP4T switch 119 may optionally be the control unit 116, which also drives the DPDT switch 115.

FIG. 2 shows a transmitting and receiving apparatus 200 with a frontend model 201. The transmitting and receiving apparatus 200 and the frontend module 201 each represent a second exemplary embodiment for, respectively, the transmitting apparatus according to the invention and the frontend module according to the invention. The transmitting and receiving apparatus 200 also has radio-frequency ICs 202 and 203, as well as an antenna 204.

Major sections of the transmitting and receiving apparatus 200 correspond to those of the transmitting and receiving apparatus 100 illustrated in FIG. 1. Reference should be made to the above description with respect to the identical assemblies. In contrast to the transmitting and receiving apparatus 100, the radio-frequency IC 202 in the second exemplary embodiment is coupled to the frontend module 201 via only one connection 205, rather than two connections. The connection 205 is coupled on the frontend module 201 end to a connection 206. Both the Bluetooth transmitted signals and the Bluetooth received signals are transferred via the connections 205 and 206.

Apart from this, the frontend module 201 has a DPDT switch 207, a control unit 208, a power amplifier 209, a transformer 210, an SP3T (single-pole/triple-throw) switch 211 and a bandpass filter 212. The components mentioned are coupled in the same manner as the corresponding components in FIG. 1. The only difference is that the SP4T switch 119 shown in FIG. 1 has been replaced by the SP3T switch 211, since the output 110 provided for the frontend module 100 is not needed for the Bluetooth received signals.

The method of operation of the transmitting and receiving apparatus 200 likewise corresponds to the method of operation of the transmitting and receiving apparatus 100, with the difference that, when Bluetooth received signals are being received, these are passed from the SP3T switch 211 via the DPDT switch 207 to the radio-frequency IC 202.

The block diagram of the transmitting and receiving apparatus 200, which is already known from FIG. 2, is shown once again in FIG. 3 in order to illustrate the method of operation of the DPDT switch 207. The variable connection options are illustrated there, instead of the DPDT switch 207.

In a first switch position S1, the DPDT switch 207 couples the connection 213 to the connection 215, and couples the connection 214 to the connection 216. In the switch position S1, Bluetooth transmitted signals can be passed from the radio-frequency IC 202 to the antenna 204 when the SP3T switch 211 is in a corresponding switch position. In this case, the transmitted signals are passed via a bypass signal line 217, which makes it possible to bypass the power amplifier 209, and, if required, to switch it off at least at times. Alternatively, in the switch position S1 and when the SP3T switch 211 is in a corresponding switch position, WLAN transmitted signals are passed from the radio-frequency IC 203 via the power amplifier 209 to the antenna 204. During reception, Bluetooth received signals can be transferred, in the switch position S1, via the bypass signal line 217 to the radio-frequency IC 202.

In the second switch position S2, the DPDT switch 207 couples the connection 213 to the connection 216, and couples the connection 214 to the connection 215. In the switch position S2, and with the SP3T switch 211 in a corresponding switch position, Bluetooth transmitted signals can be passed from the radio-frequency IC 202 via the power amplifier 209 to the antenna 204. Alternatively, in the switch position S2, and with the SP3T switch 211 in a corresponding switch position, WLAN transmitted signals can be passed from the radio-frequency IC 203 to the antenna 204. In this case, the transmitted signals are passed via the bypass signal line 217, so that the power amplifier 209 is bypassed and, if required, can be switched off.

On reception of WLAN received signals, these are passed, as in the case of the transmitting and receiving apparatus 100, via the transformer 210 to the radio-frequency IC 203.

It should be noted that the frontend modules 101 and 201 can be used not only for Bluetooth high-power applications but also for Bluetooth low-power applications.

In the two present exemplary embodiments, the frontend modules 101 and 201 are autonomous modules, that is to say they are produced so as to be physically separate from the radio-frequency ICs 102 and 103, or 202 and 203, respectively. However, it is also feasible for the frontend modules 101 and 201 to be integrated together with at least one of the radio-frequency ICs on one substrate. Also, the radio-frequency ICs 102 and 103 (or 202 and 203) can be integrated together on one substrate.

What is claimed is:

1. A frontend module comprising:
   a first input for reception of first transmitted signals;
   a second input for reception of second transmitted signals;
   an amplifier stage;
   a bypass signal line;
   an output for emission of transmitted signals to an antenna; and
   a switching unit coupled between the first and second inputs and the output, wherein
      in a first switch position, the switching unit forms a signal path between the first input and the output such that the signal path includes the amplifier stage;
      in a second switch position, the switching unit forms a signal path between the first input and the output such that the signal path includes the bypass signal line;
      in a third switch position, the switching unit forms a signal path between the second input and the output such that the signal path includes the amplifier stage; and
      in a fourth switch position, the switching unit forms a signal path between the second input and the output such that the signal path includes the bypass signal line.

2. The frontend module according to claim 1, wherein:
   the switching unit comprises a first switch, that
      in the first switch position, couples the first input to an input of the amplifier stage,
      in the second switch position, couples the first input to a first connection of the bypass signal line,
      in the third switch position, couples the second input to the input of the amplifier stage, and
      in the fourth switch position, couples the second input to the first connection of the bypass signal line.

3. The frontend module according to claim 2, wherein the first switch comprises a DPDT switch.

4. The frontend module according to claim 2, wherein:
   the switching unit further comprises a second switch, that
      in the first and the third switch positions, couples the output of the amplifier stage to the output of the frontend module, and
      in the second and the fourth switch positions, couples the second connection of the bypass signal line to the output of the frontend module.

5. The frontend module according to claim 1, further comprising a control unit coupled to control the switching unit.

6. The frontend module according claim 1, wherein the amplifier stage is switched off at least at times when the switching unit is in the second or the fourth switch position.

7. The frontend module according to claim 1, wherein the frontend module is also designed for reception and for passing on the received signals, and the signal path for at least a part of the received signals comprises the bypass signal line.

8. A frontend module comprising:
   a first input for reception of first transmitted signals;
   a second input for reception of second transmitted signals;
   an amplifier stage;
   a bypass signal line;
   an output for selective emission of the first transmitted signals or the second transmitted signals, or for selective emission of transmitted signals that are obtained from the first or the second transmitted signals to an antenna; and
   a first switch, that, in one switch position, couples the first input to an input of the amplifier stage and the second input to a first connection of the bypass signal line, and that, in a further switch position, couples the first input to the first connection of the bypass signal line, and couples the second input to the input of the amplifier stage.

9. The frontend module according to claim 8, wherein the first switch comprises a DPDT switch.

10. The frontend module according to claim 8, further comprising:
a second switch that, in one switch position, couples the output of the amplifier stage to the output of the frontend module, and that, in a further switch position, couples the second connection of the bypass signal line to the output of the frontend module.

11. The frontend module according to claim 10, further comprising a control unit coupled to control the first switch and the second switch.

12. The frontend module according to claim 8, wherein the amplifier stage is switched off at least at times when no transmitted signals are being amplified by the amplifier stage.

13. The frontend module according to claim 8, wherein the frontend module is also designed for reception and for passing on received signals, and the signal path for at least a part of the received signals comprises the bypass signal line.

14. A frontend module comprising:
a first input for reception of first transmitted signals;
a second input for reception of second transmitted signals;
means for amplifying transmitted signals;
means for passing on non-amplified transmitted signals;
an output for selective emission of the first transmitted signals or the second transmitted signals, or for selective emission of transmitted signals that are obtained from the first or the second transmitted signals to an antenna; and
means for producing a connection that selectively couples either the first input to the input of the means for amplifying, and couples the second input to a first connection of the means for passing, or couples the first input to the first connection of the means for passing, and couples the second input to the input of the means for amplifying.

15. The frontend module according to claim 14, wherein the means for producing a connection comprises a DPDT switch.

16. The frontend module according to claim 14, further comprising:
means for producing a connection that selectively couples either the output of the means for amplifying to the output of the frontend module, or couples the second connection of the means for passing to the output of the frontend module.

17. The frontend module according to claim 14, wherein the means for amplifying is switched off at least at times when no transmitted signals are being amplified by the means.

18. A transmitting apparatus comprising:
a first apparatus for providing first transmitted signals;
a second apparatus for providing second transmitted signals; and
a frontend module comprising:
a first input coupled to the first apparatus;
a second input coupled to the second apparatus;
an amplifier stage;
a bypass signal line;
an output for emission of transmitted signals to an antenna; and
a switching unit coupled between the first and second inputs and the output, wherein
in a first switch position, the switching unit forms a signal path between the first input and the output such that the signal path includes the amplifier stage;
in a second switch position, the switching unit forms a signal path between the first input and the output such that the signal path includes the bypass signal line;
in a third switch position, the switching unit forms a signal path between the second input and the output such that the signal path includes the amplifier stage; and
in a fourth switch position, the switching unit forms a signal path between the second input and the output such that the signal path includes the bypass signal line.

19. The transmitting apparatus according to claim 18, wherein the first apparatus and the second apparatus each comprise a radio-frequency integrated circuit.

20. The transmitting apparatus according to claim 18, wherein the first transmitted signals comprise Bluetooth transmitted signals, and the second transmitted signals comprise WLAN transmitted signals.

21. The transmitting apparatus according to claim 18, further comprising:
an antenna coupled to the output of the frontend module.

22. A method of processing transmitted signals, the method comprising:
receiving a first transmitted signal at a first input of a communication module;
if the first transmitted signal is below a predetermined level, amplifying the first transmitted signal and providing the amplified first transmitted signal to an output;
if the first transmitted signal is not below the predetermined level, providing the first transmitted signal to the output without amplification;
receiving a second transmitted signal at a second input of the communication module, the second input being different than the first input;
if the second transmitted signal is below the predetermined level, amplifying the second transmitted signal and providing the amplified second transmitted signal to the output; and
if the second transmitted signal is not below the predetermined level, providing the second transmitted signal to the output without amplification.

23. The method of claim 22, wherein the first transmitted signal comprises a Bluetooth signal or a WLAN signal.

24. The method of claim 23, wherein the first transmitted signal comprises a Bluetooth signal and the second transmitted signal comprises a WLAN signal.

25. The method of claim 22, wherein amplifying the first and second transmitted signals is performed by an amplifier, the amplifier being turned off when the first or second transmitted signals are not below the predetermined level.

* * * * *